United States Patent [19]

Shibata et al.

[11] Patent Number: 4,524,380

[45] Date of Patent: Jun. 18, 1985

[54] CHROMA SIGNAL RECORDING AND REPRODUCING CIRCUIT

[75] Inventors: Akira Shibata; Keiichi Komatsu; Tomomitsu Kuroyanagi, all of Katsuta; Noboru Kojima, Yokohama, all of Japan

[73] Assignee: Hitachi, Ltd., Tokyo, Japan

[21] Appl. No.: 447,387

[22] Filed: Dec. 7, 1982

[30] Foreign Application Priority Data

Dec. 7, 1981 [JP] Japan .................. 56-195687
Feb. 17, 1982 [JP] Japan .................. 57-22703
May 17, 1982 [JP] Japan .................. 57-81402
Sep. 1, 1982 [JP] Japan .................. 57-150763

[51] Int. Cl.³ .......................................... H04N 9/491
[52] U.S. Cl. ................................... 358/316; 358/329
[58] Field of Search ............... 358/328, 315, 316, 318, 358/27, 31, 329

[56] References Cited

U.S. PATENT DOCUMENTS 3,816,848  6/1974  Skinner .................. 358/47
4,068,257  1/1978  Hirota et al. .......... 358/316
4,068,259  1/1978  Tinet et al. ........... 358/310
4,220,964  9/1980  Yamagiwa et al. ....... 358/328
4,263,612  4/1981  Gibson et al. ......... 358/31

Primary Examiner—Richard Murray
Attorney, Agent, or Firm—Antonelli, Terry & Wands

[57] ABSTRACT

A chroma signal recording and reproducing circuit of a magnetic recording and reproducing apparatus having a recording circuit for frequency-modulating a luminance signal of a color video signal, low-frequency converting a chroma signal and frequency-multiplexing those signals for recording and a reproducing circuit for frequency-converting the low-frequency converted chroma signal in a reproduced signal and frequency-demodulating the FM luminance signal to reproduce a color video signal is disclosed. The circuit comprises a chroma signal recording circuit including a first ACC circuit and a first frequency converter connected to the first ACC circuit, and a chroma signal reproducing circuit including a second ACC circuit, a second frequency converter connected to the second ACC circuit, a comb filter connected to the second frequency converter and a deemphasis circuit connected to the output of the comb filter.

31 Claims, 38 Drawing Figures

FREQUENCY

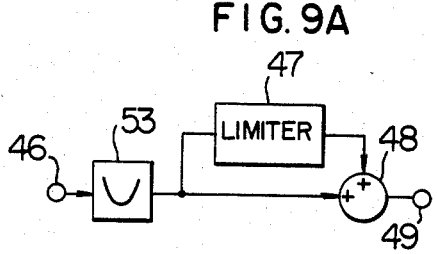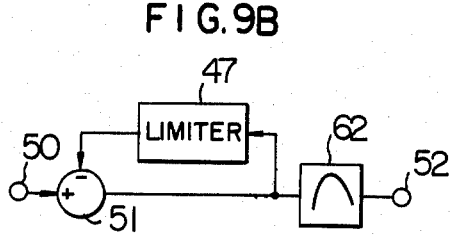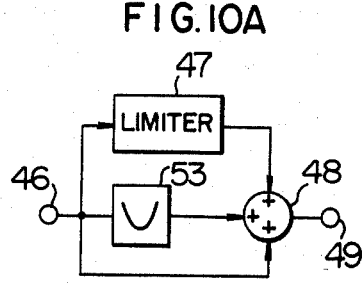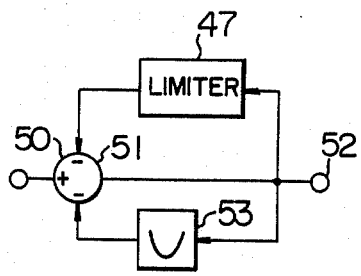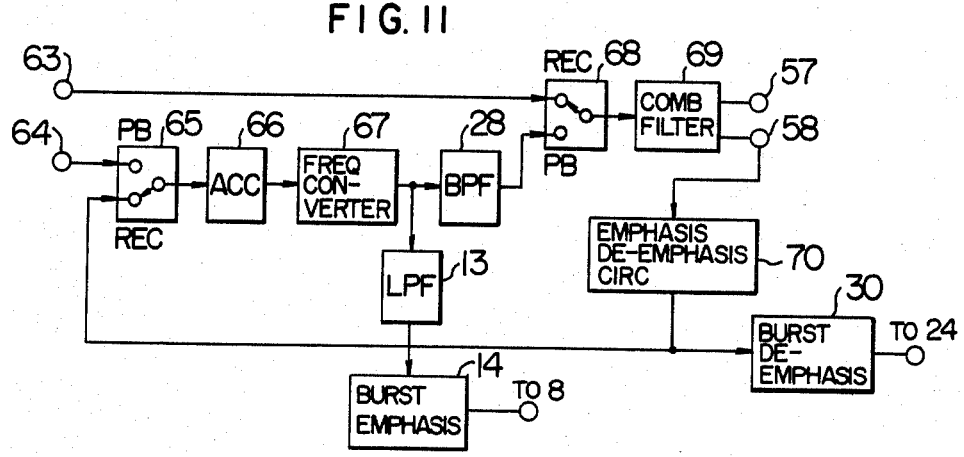

F I G. 19
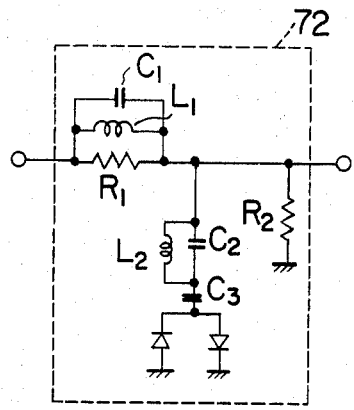
F I G. 20
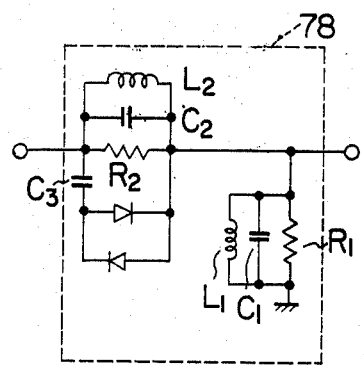
F I G. 21
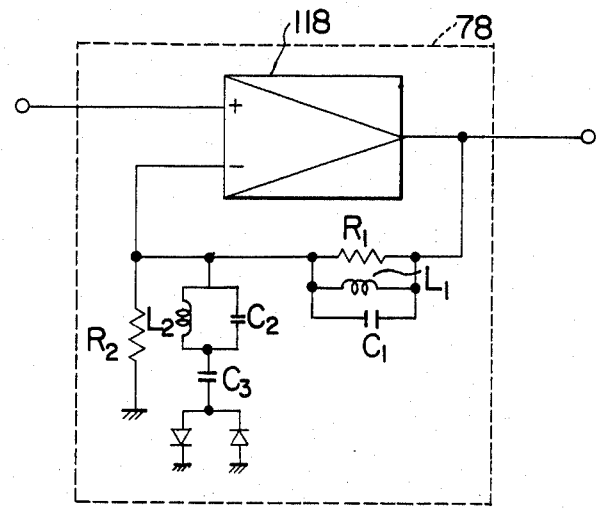
F I G. 22
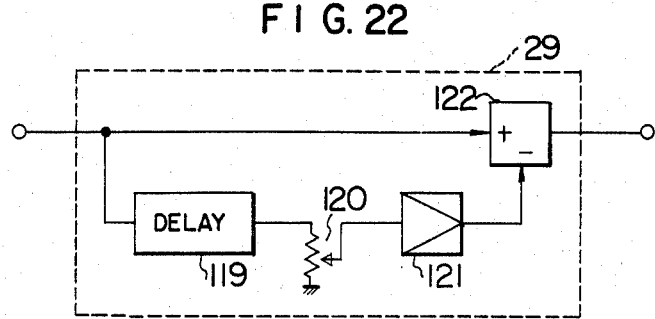

CHROMA SIGNAL RECORDING AND REPRODUCING CIRCUIT

BACKGROUND OF THE INVENTION

1. Field of the Invention

The present invention relates to a chroma signal recording and reproducing circuit for supplying a high quality image in a magnetic recording and reproducing apparatus such as a video tape recorder (VTR).

2. Description of the Prior Art

In a prior art VTR, when a television color video signal is recorded or reproduced, a frequency modulated luminance signal component in the color video signal and a low-frequency converted carrier chroma signal component are mixed and the mixture is recorded on a magnetic tape by a magnetic head. In a reproduction operation, the luminance signal is reproduced from a signal reproduced by the magnetic head by frequency-demodulating it through a high-pass filter (HPF) and it is frequency-converted through a low-pass filter (LPF) to reproduce the chroma signal. In the recording and reproducing system, disturbances by a leakage of the chroma signal into the luminance signal and a leakage of the luminance signal into the chroma signal in a recording circuit, and a leakage of the chroma signal into the luminance signal and a leakage of the luminance signal into the chroma signal in a reproducing circuit, that is, a chroma moiré disturbance, a luminance signal dot disturbance and a cross-color disturbance occur. A spurious disturbance by a burst signal or a psudo-burst signal from a delay line which forms a comb filter in the reproducing circuit also occurs.

BRIEF DESCRIPTION OF THE DRAWINGS

FIGS. 9A and 9B show block diagrams of other embodiments of the emphasis circuit and the deemphasis circuit, respectively, used in the present invention;

FIGS. 10A and 10B show block diagrams of other embodiments of the emphasis circuit and the deemphasis circuit, respectively, used in the present invention;

FIG. 11 shows a block diagram of a modification of the circuit of FIG. 7;

FIG. 19 shows a circuit diagram of an embodiment of the dynamic emphasis circuit used in the present invention;

FIGS. 20 and 21 show circuit diagrams of embodiments of the dynamic deemphasis circuit used in the present invention;

FIG. 22 shows a circuit diagram of an embodiment of a comb filter used in the present invention;

DETAILED DESCRIPTION

Figure 1:
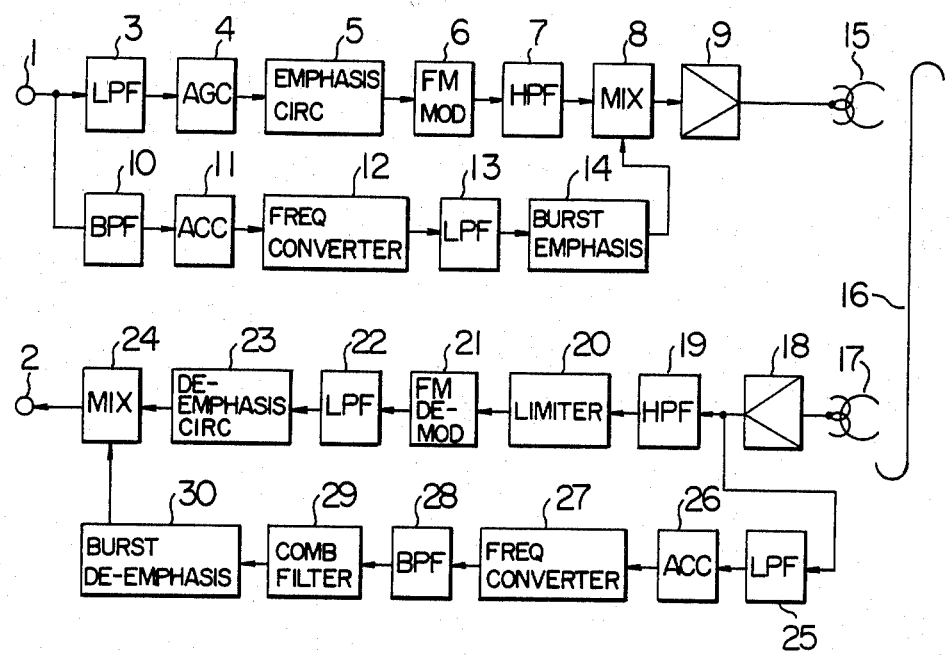
FIG. 1 shows a circuit block diagram of an example of a prior art color video signal magnetic recording and reproducing apparatus.

In order to first explain the occurrence of such disturbance as described above concerning the prior art, an example of a prior art color signal processing circuit of the VTR is shown in FIG. 1.

The operation of the circuit in the recording operation is first explained. A color video signal is applied to an input terminal 1 and it is supplied to a LPF 3 and a band-pass filter (BPF) 10. The LPF 3 and the BPF 10 serve to separate the color video signal to a brilliance signal and a chroma signal. The luminance signal is taken out from an output terminal of the LPF 3 and the chroma signal is taken out from an output terminal of the BPF 10. The luminance signal from the LPF 3 is supplied to a frequency modulator 6 through an automatic gain control circuit (AGC) 4 and an emphasis circuit 5 which emphasizes a high frequency component of the luminance signal, and a frequency modulated luminance signal is supplied to a mixer 8 through a HPF 7. On the other hand, the chroma signal from the BPF 10 is supplied to a frequency converter 12 through an automatic color control circuit (ACC) 11, and a low-frequency converted chroma signal is supplied to a LPF 13. The low-frequency converted chroma signal is supplied to the mixer 8 through a burst emphasis circuit 14 which emphasizes a burst signal level. The FM signal and the low-frequency converted chroma signal supplied to the mixer 8 then pass through a recording amplifier 9 and are recorded on a video tape 16 by a recording head 15.

The playback operation is next explained. A reproduced signal from a playback head 17 is supplied to a HPF 19 and a LPF 25 through a preamplifier 18. The HPF 19 and the LPF 25 serve to separate the reproduced signal into an FM luminance signal and a low-frequency converted chroma signal. The FM luminance signal is taken out from an output terminal of the HPF 19 and the low-frequency converted chroma signal is taken out from an output terminal of the LPF 25. The FM luminance signal from the HPF 19 is supplied to a frequency demodulator 21 through a limiter 20 and a demodulated luminance signal is supplied to a deemphasis circuit 23 through a LPF 22. The deemphasis circuit 23 deemphasizes a high frequency component to return the luminance signal which has been high-frequency emphasized by the emphasis circuit 5 in the recording operation to a normal level. An output of the deemphasis circuit 23 is supplied to a mixer 24. On the other hand, the low-frequency converted chroma signal from the LPF 25 is supplied to a frequency converter 27 through an ACC 26 and a chroma signal reconverted to the original frequency is supplied to a BPF 28. The chroma signal is then passed through a comb filter 29 to suppress a cross-talk component of the chroma signal from adjacent video tracks and supplied to a burst deemphasis circuit 30 to deemphasize the burst signal. An output of the burst deemphasis circuit 30 is then supplied to the mixer 24. The luminance signal and the chroma signal are mixed in the mixer 24 and the mixed signal is supplied to an output terminal 2 as a reproduced color video signal.

As shown in FIG. 1, in the prior art circuit, the LPF 3 and the BPF 10 are provided to separate the color video signal to be recorded into the luminance signal and the chroma signal. A problem encountered here is that the luminance signal and the chroma signal are not perfectly separated by the LPF 3 and the BPF 10. As a result, the color moiré disturbance and the luminance signal dot disturbance appear on a reproduced image. The FM luminance signal and the low-frequency converted chroma signal have partially overlapped frequency bands and a cross-talk to the low-frequency converted chroma signal by a lower side band of the FM luminance signal causes the cross-color disturbance. In addition, a spurious disturbance is produced by the comb filter in the reproducing circuit which is a 1H-delay line and it appears as a disturbance on the screen. Further, when a deviation $\alpha_H$ of $H_L$ from an adjacent track (where $H_L$ is a length of one horizontal scan period of signal along an extended line of record track) is equal to $1.0H_L$ or $0.75H_L$, an H alignment (horizontal sync signals of adjacent tracks being arranged adjacently) is distorted and the burst signal from the adjacent track leaks. Furthermore, the color moiré disturbance and the luminance signal dot disturbance also occur. The chroma signal leaks into the high frequency band of the luminance signal at the output of the LPF 3, and the luminance signal leaks into the low frequency band of the chroma signal at the output of the BPF 10, and they are frequency modulated and low-frequency converted, respectively. The leakage components substantially correspond to the overlapping portion of the low-frequency converted chroma signal and the FM luminance signal. In the reproducing operation, a portion of the overlapping portion is frequency-demodulated through the HPF 19 and another portion is frequency-converted through the LPF 25 and they are produced as the reproduced color video signal. In this case, if the chroma signal which was frequency-modulated in the recording operation is frequency-converted through the LPF 25 in the reproducing operation, the color moiré disturbance occurs. If the luminance signal which was low-frequency converted in the recording operation is frequency-demodulated through the HPF 19 in the reproducing operation, the luminance signal dot disturbance occurs. In the luminance signal processing circuit, the emphasis circuit 5 is provided to improve an S/N ratio. It also emphasizes the leaked chroma signal and enhances the color moiré disturbance.

Figure 2:
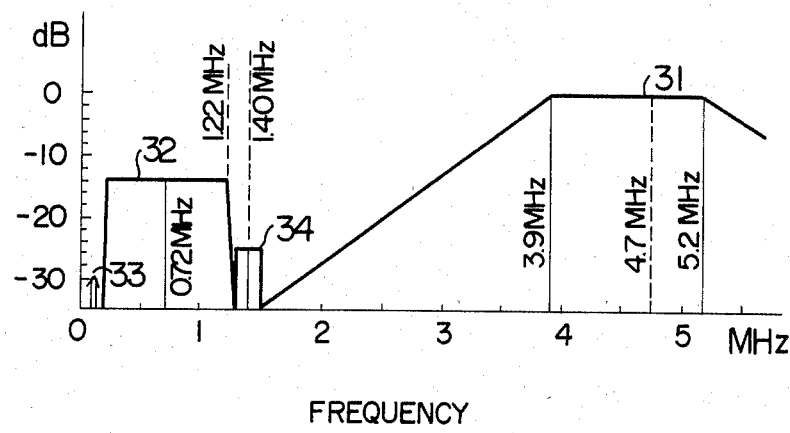
FIG. 2 shows a frequency spectrum of a color video signal which is frequency-multiplex recorded on a magnetic tape.

When a pilot signal for auto-tracking or an audio signal is frequency-multiplex recorded on the record track of the video tape in addition to the luminance signal component and the chroma signal component, another problem arises in addition to the problems discussed above. A spectrum of a signal recorded on the record track is shown in FIG. 2, in which numeral 31 denotes the FM luminance signal, numeral 32 denotes the low-frequency converted chroma signal, numeral 33 denotes the pilot signal and numeral 34 denotes the FM audio signal. A problem encountered here is that the pilot signal 33 and the FM audio signal 34 interfere with the low-frequency converted chroma signal 32 so that a quality of the chroma image is degraded.

The pilot signal 33 and the FM audio signal 34 are reproduced as a side band signal of the chroma signal 32 to produce a beat disturbance on the screen, and a spurious signal $f_c \pm 2f_p$ (where $f_c$ is a chroma frequency and $f_p$ is a pilot frequency) is produced by a nonlinearity of the tape and the head and hence a beat disturbance appears on the screen.

Those disturbances are due to the facts that (1) the chroma signal is an amplitude modulated signal, (2) the pilot frequency and the FM audio frequency are close to the chroma signal band and (3) the recording levels of the pilot signal and the FM audio signal are not sufficiently low.

To resolve the above problem, the respective frequencies may be sufficiently separated or the chroma signal may be converted to an FM signal before it is recorded. However, this requires a wide band width and results in reduction of recording density. Alternatively, the recording levels of the pilot signal and the FM audio signal may be sufficiently lowered. However, this causes a problem in a tracking control characteristic and a quality of sound.

SUMMARY OF THE INVENTION

It is an object of the present invention to provide a chroma signal recording and reproducing circuit in a magnetic recording and reproducing apparatus which can reduce a noise introduced into a chroma signal.

It is another object of the present invention to provide a novel chroma signal recording and reproducing circuit in a VTR which is less susceptible to the cross-color disturbance, the chroma moiré disturbance, the luminance signal dot disturbance, the disturbance by mixing of a pilot signal or an FM signal and the spurious disturbance due to non-linearity of a tape or a head.

It is another object of the present invention to provide a chroma signal reproducing circuit in a VTR which can eliminate the spurious disturbance due to a burst signal and a quasi-burst signal produced by a comb-filter in a reproducing circuit.

In order to achieve the above objects, in accordance with one feature of the present invention, in a magnetic recording and reproducing apparatus which frequency-modulates the luminance signal and low-frequency-converts the chroma signal and frequency-multiplexes them for recording, a deemphasis circuit is inserted in the reproducing circuit for the chroma signal following the comb filter stage.

In accordance with another feature of the present invention, an emphasis circuit is inserted in a recording circuit between an ACC circuit and a frequency converter, and a signal at an input stage of the emphasis circuit is supplied to a detection circuit of the ACC circuit and a signal at an output stage of the deemphasis circuit inserted in the reproducing circuit following to the comb filter is supplied to the detection circuit of the ACC circuit.

In accordance with another feature of the present invention, in order to eliminate the chroma moiré disturbance and the luminance dot disturbance, a luminance signal output terminal and a chroma signal output terminal of a color camera, or a luminance signal output terminal and a chroma signal output terminal of the comb filter having an input terminal thereof connected to a video signal terminal are directly connected to the ACC circuit of the luminance signal recording circuit and the ACC circuit of the chroma signal recording circuit, respectively, of the magnetic recording and reproducing circuit without routing a BPF and a LPF.

In accordance with a further feature of the present invention, as the emphasis circuit and the deemphasis circuit, a dynamic emphasis circuit which dynamically emphasizes a side band energy and a dynamic deemphasis circuit which dynamically deemphasizes the side band energy are used.

In accordance with a still further feature of the present invention, a burst signal is taken out from the output of the dynamic deemphasis circuit inserted in the chroma signal reproducing circuit following to the comb filter and a time base error signal is extracted from the burst signal.

While the chroma signal emphasized in the recording operation is deemphasized in the reproducing operation in the above description, it is not always necessary to emphasize the chroma signal in the recording operation and the various disturbances to the chroma signal can be reduced only by the deemphasis in the reproducing operation. In this case, the band width of a low level chroma signal is narrowed and a transient characteristic of the chroma signal is slightly degraded but a visual problem can be substantially resolved by optimizing the deemphasis characteristic.

It should be understood that the present invention is applicable not only to the chroma signal recording and reproducing circuit of the magnetic recording and reproducing apparatus but also to the chroma signal reproducing circuit of the reproducing only magnetic reproducing apparatus.

Figure 3A:
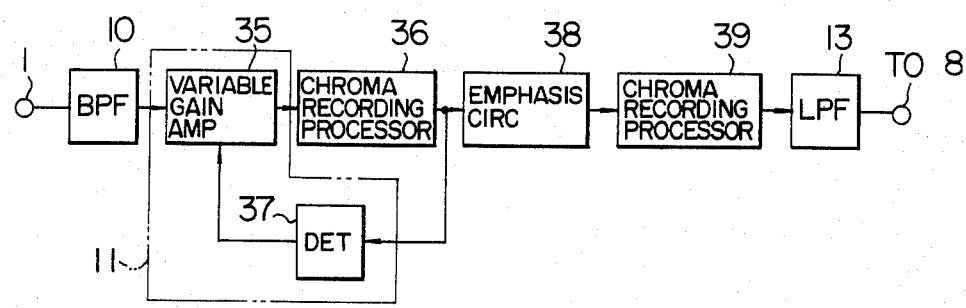
FIGS. 3A and 3B show a first embodiment of the present invention, and show a chroma signal recording circuit and a chroma signal reproducing circuit, respectively.
Figure 3B:
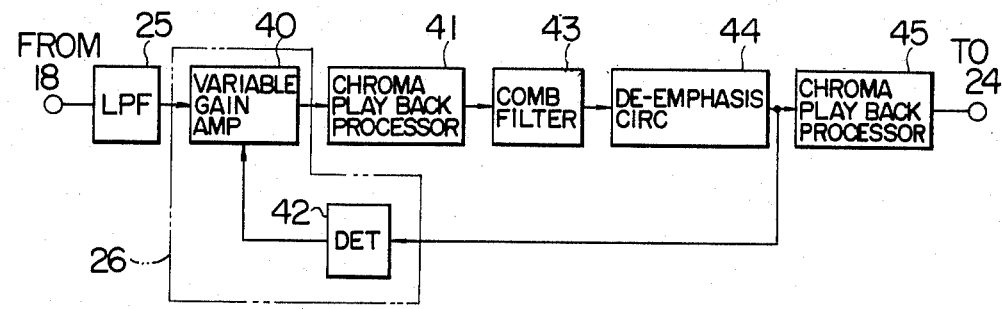

FIGS. 3A and 3B show a first embodiment of the present invention. In FIG. 3A, a chroma signal component is extracted from a video signal applied to an input terminal 1, by a BPF 10. The chroma signal is then adjusted to a constant level by an ACC circuit comprising a variable gain amplifier 35 and a detection circuit 37 and then supplied to a chroma signal recording processor 36, thence to a chroma emphasis circuit 38. The chroma signal having its low level signal emphasized by the chroma emphasis circuit 38 is then converted to a low frequency signal by a chroma signal recording processing 39, an output of which is supplied to a LPF 13 to produce a low-frequency converted chroma signal which is then applied to a mixer to be mixed with a FM brilliance signal. The chroma signal recording circuit of the present embodiment is thus constructed.

FIG. 3B shows a chroma signal reproducing circuit of the present embodiment. A signal amplified by a playback amplifier is supplied to a LPF 25. A chroma signal extracted by the LPF 25 is adjusted to a constant level by an ACC circuit comprising a variable gain amplifier 40 and a detection circuit 42, and the low-frequency converted chroma signal is reconverted to the original chroma signal by a chroma signal playback processor 41 and a comb filter 43. The chroma signal is then supplied to a chroma deemphasis circuit 44 where non-linearity caused by the chroma emphasis in the recording operation is compensated, and the chroma signal is then supplied to a chroma signal playback processor 45, an output of which is supplied to the mixer to be mixed with the luminance signal.

The chroma signal recording processors 36 and 39 each may comprise a frequency converter, a burst emphasis circuit and a quasi-burst addition circuit, the chroma signal playback processor 41 includes at least a frequency converter and the chroma signal playback processor 45 may comprises a burst deemphasis circuit, a quasi-burst elimination circuit and a HPF.

In accordance with the present embodiment, the following problems encountered in the prior art apparatus are suppressed and a chroma S/N ratio is improved.

(1) Spurious disturbance (particularly burst disturbance and quasi-burst disturbance) caused by a delay line of the comb filter.

(2) Cross-color disturbance by a cross-talk from a lower side band of the luminance FM signal.

(3) Leakage of the burst signal or the quasi burst signal from adjacent tracks when H-arrangement is not attained.

A first feature of the first embodiment described above resides in that the chroma deemphasis circuit 44 is inserted following to the comb filter 43. The reason therefor is because it intends to resolve the prior art problems (1) and (3) described above.

Figure 3C:
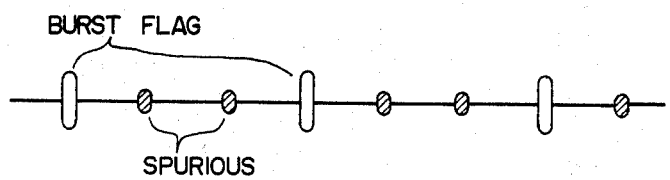
FIG. 3C shows a signal waveform for illustrating an effect of the embodiments of FIGS. 3A and 3B.

The suppression of the degradation of the image quality due to the spurious component produced by the delay line of the comb filter (problem (1)) is discussed below. When an ultrasonic delay line is used as the comb filter, spurious component such as second order reflection and third order reflection of the delay line is superimposed on the output of the comb filter. FIG. 3C shows an example of superposition of the spurious component. When the chroma component is small, the spurious component of the burst signal shown by hatching causes the degradation of the image quality. When a CCD (change coupled device) is used as the delay line, leakage of a driving clock pulse is superimposed resulting in the degradation of the image quality.

Accordingly, by inserting the deemphasis circuit 44 following to the comb filter 43, having a dynamic deemphasis characteristic which compresses a lower amplitude component as will be explained later, the spurious component which is of small amplitude level is suppressed. The spectrum of the chroma signal is concentrated at a center of a sub-carrier frequency while a spectrum of the burst signal is spread. Accordingly, by using the deemphasis having a frequency characteristic for compressing a side band as will be explained later, a side band energy of the spurious component is suppressed and the degradation of the image quality is relieved. This feature is irrespective of the provision of the emphasis circuit in the chroma signal recording circuit.

As to the problem (3), the effect of the deemphasis circuit 44 is not attained unless the cross-talk from the adjacent tracks is fully suppressed by the comb filter 43. Accordingly, it is necessary to insert the deemphasis circuit 44 following to the output stage of the comb filter 43.

A second feature of the first embodiment resides in that the ACC loop is formed such that the input signal (or output signal) level of the chroma emphasis circuit 38 and the output signal (or input signal) of the chroma deemphasis circuit 44 are substantially equal. The chroma emphasis circuit 38 and the chroma deemphasis circuit 44 are both non-linear circuits. In order that they are inverse circuits to each other, it is necessary that the input signal level of the emphasis circuit 38 and the output signal level of the deemphasis circuit 44 are substantially equal.

Since the ACC circuit operates such that the input signal levels of the detection circuit 37 and 42 are constant, it is necessary to design such that the input signal to the detection circuit 37 and the input signal to the emphasis circuit 38 are substantially equal and the input signal of the detection circuit 42 and the output signal of the deemphasis circuit 44 are substantially equal.

Alternatively, it is possible to design such that the input signal to the detection circuit 37 is substantially equal to the output signal of the emphasis circuit 38. In this case, it may be designed such that the input signal to the detection circuit 42 is substantially equal to the input signal to the deemphasis circuit 44.

In FIG. 3A, the detection loop of the ACC circuit is taken out of the preceding stage of the chroma emphasis circuit 38. Alternatively, it may be taken out of the succeeding stage of the chroma emphasis circuit 38. Similarly, in FIG. 3B, the detection loop may be taken out of the preceding stage of the chroma deemphasis circuit 44.

Specific embodiments of the chroma emphasis circuit and the chroma deemphasis circuit are explained in detail with reference to FIGS. 4A, 4B, 5A, 5B and 5C. In the chroma emphasis circuit of FIG. 4A, a chroma signal applied to an input terminal 46 is branched into a path including a limiter circuit 47 and a direct path and the signals from those paths are mixed in an adder circuit 48, an output of which is supplied to an output terminal 49. The limiter circuit 47 produces an amplitude-limited signal for a large amplitude signal. Thus, a characteristic of the chroma emphasis circuit of FIG. 4A linearly emphasizes a low level signal and limits a high level signal.

Figure 4A:
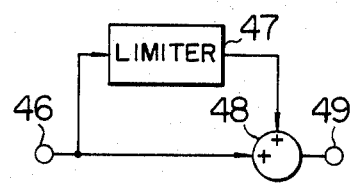
FIGS. 4A and 4B show block diagrams of an emphasis circuit and a deemphasis circuit, respectively, used in the present invention.
Figure 4B:
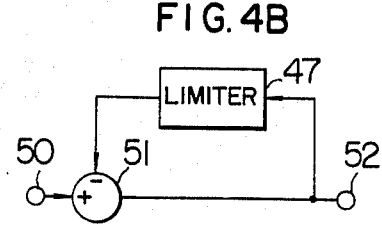

The chroma deemphasis circuit of FIG. 4B exhibits a feedback inverse circuit characteristic of the circuit of FIG. 4A. A reproduced chroma signal applied to an input terminal 50 is subtracted by a signal fed back from an output terminal 52 through a limiter 47 by a subtraction circuit 51, an output of which is supplied to the output terminal 52. Thus, a transfer function $R(\omega)$ of the chroma emphasis circuit of FIG. 4A is expressed by:

$$R(\omega) = 1 + H_1(\omega)$$

where $H_1(\omega)$ is a transfer function of the limiter circuit 47 of FIG. 4A.

A transfer function $P(\omega)$ of the chroma deemphasis circuit of FIG. 4B is expressed by:

$$P(\omega) = 1/\{1 + H_1(\omega)\}$$

Accordingly, if the transfer functions $H_1(\omega)$ of the limiter circuits of the emphasis circuit and the deemphasis circuit are equal, a total transfer characteristic of the emphasis circuit and the deemphasis circuit is expressed by:

$$R(\omega) \cdot P(\omega) = \{1 + H_1(\omega)\}/\{1 + H_1(\omega)\} = 1$$

Thus, the non-linear characteristic of the emphasis circuit is corrected by the deemphasis circuit and the original signal can be substantially perfectly recovered.

The deemphasis circuit of FIG. 4B is of feedback type. Alternatively, a feedforward type deemphasis circuit may be constructed.

Figure 5A:
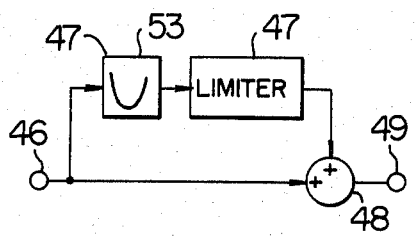
FIGS. 5A and 5B show block diagrams of an emphasis circuit and a deemphasis circuit, respectively, used in the present invention.
Figure 5B:
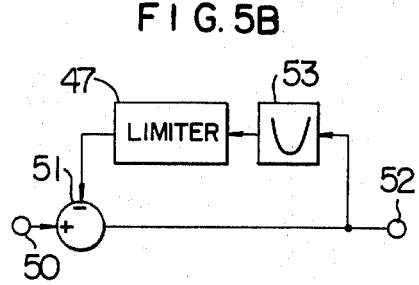
Figure 5C:
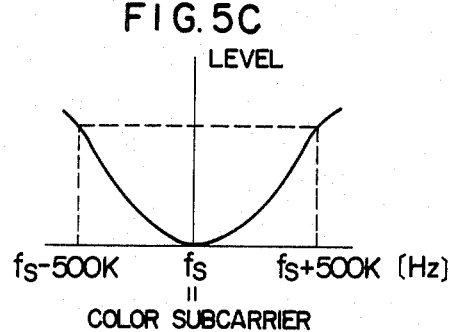
FIG. 5C shows a reverse frequency characteristic of a bell filter used in the circuits of FIGS. 5A and 5B.

FIGS. 5A and 5B show other embodiments. A difference from those of FIGS. 4A and 4B resides in that a chroma signal side band extraction circuit such as a reverse bell filter having a characteristic shown in FIG. 5C is provided. Thus, the emphasis is effected to only the side band of the chroma signal. The side band of the chroma signal is a low level high frequency band and susceptable to a noise. Accordingly, by emphasizing the side band in the recording operation, the S/N ratio of the chroma signal is improved and a high quality of image is reproduced.

Figure 6:
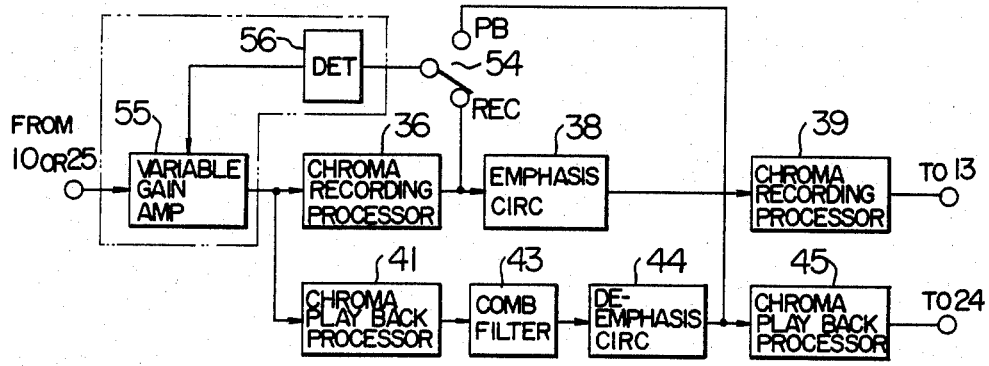
FIG. 6 shows a block diagram of a circuit in which portions of the chroma signal recording circuit and the chroma signal reproducing circuit shown in FIGS. 3A and 3B are shared.

FIG. 6 shows an embodiment in which the chroma processor of the present invention is shared by the recording circuit and the reproducing circuit. In FIG. 6, a record playback selection switch 54 plays an important role. In the recording operation, only the chroma signal of a video signal from the BPF 10 is applied to an input terminal. In the recording operation, the record-playback selection switch 54 is in a position shown and a variable gain amplififer 55 and a detection circuit 56 operate as the recording ACC circuit. The chroma signal which was level-adjusted by the ACC circuit is supplied to a chroma signal recording processor 36, thence to a chroma emphasis circuit 38 in which a low level signal is emphasized. The chroma signal is then frequency-converted to a low frequency signal by a chroma signal recording processor 39, an output of which is supplied to a LPF 13. In the playback operation, only the chroma signal of the reproduced video signal from the LPF 25 is supplied to the input terminal which is common to the recording circuit. In the playback operation, the record-playback selection switch 54 is in a position opposite to the illustrated position and the variable gain amplifier 55 and the detection circuit 56 operates as the playback ACC circuit. The chroma signal from the ACC circuit is converted from the flow frequency converted carrier chroma signal to the original chroma signal by a chroma signal playback processor 41 and a comb filter 43. The chroma signal is then supplied to a chroma deemphasis circuit 44 where the emphasized characteristic in the recording operation is corrected, and the deemphasized chroma signal is supplied to a mixer 24 through a chroma signal playback processor 45. In this manner, by providing the record-playback selection switch 45, the ACC circuit can be shared by the recording circuit and the playback circuit.

The loop of the ACC detection circuit may be feed back from the succeeding stage of the chroma emphasis circuit 38 for the recording operation and the preceding stage of the chroma deemphasis circuit for the playback operation.

Figure 7:
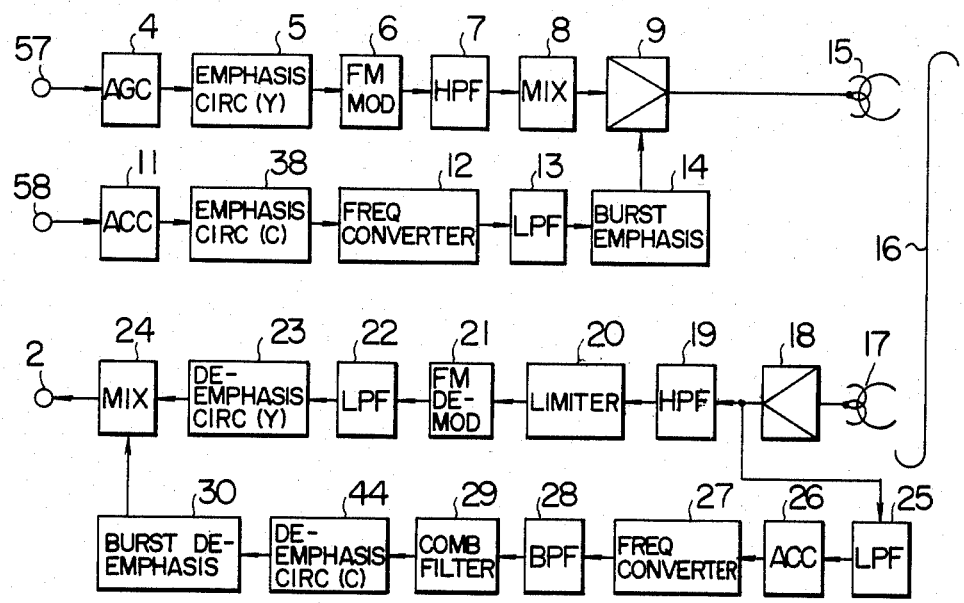
FIG. 7 shows a circuit block diagram of another embodiment of the present invention.

A second embodiment of the present invention is now explained in detail with reference to FIGS. 7, 8A, 8B and 8C. The present embodiment is intended to eliminate the cross-color disturbance as well as the chroma moiré disturbance and the luminance dot disturbance. Separate VTR video input terminals are provided for the luminance signal and the chroma signal, and the LPF and the BPF for separating the luminance signal and the chroma signal from the color video signal are omitted. In FIG. 7, numeral 57 and 58 denotes a VTR luminance signal input terminal and a VTR chroma signal input terminal, respectively. The other portion is essentially identical to the embodiments shown in FIGS. 3A and 3B.

Figure 8A:
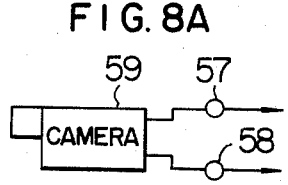
FIGS. 8A, 8B and 8C show block diagrams of input circuits to be connected to the recording circuit shown in FIG. 7.
Figure 8B:
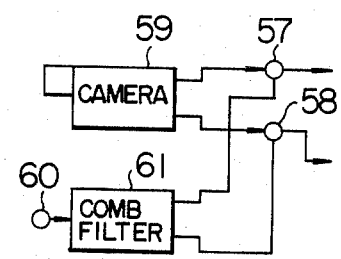
Figure 8C:
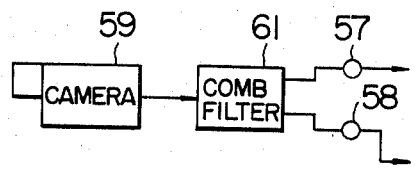

FIGS. 8A, 8B and 8C show the embodiment for supplying the luminance signal and the chroma signal to the input terminals 57 and 58, respectively.

In FIG. 8A, numeral 59 denotes a color video camera, numeral 57 denotes a VTR luminance signal input terminal and numeral 58 denotes a VTR chroma signal input terminal.

In general, the color video camera 59 includes the luminance signal and color difference signals (B-Y signal and R-Y signal).

Accordingly, the luminance signal as well as the chroma signal can be readily extracted from the color difference signals. The extracted luminance signal and the chroma signal do not leak to each other and are completely separated. In the embodiment of FIG. 8A, the completely separated luminance signal and the chroma signal are separately supplied to the VTR luminance signal input terminal 57 and the VTR chroma signal input terminal 58 without being mixed. Thus, a leakage component of the chroma signal which is frequency-modulated with the luminance signal in the recording operation and a leakage component of the luminance signal which is low-frequency converted with the chroma signal are completely suppressed. As a result, a high quality of reproduced image which is free from the chroma moiré disturbance and the luminance signal dot disturbance is obtained.

FIG. 8B shows another embodiment in which a comb filter 61 is connected in parallel between the color video camera 59 and the VTR of FIG. 8A. In FIG. 8B, numeral 60 denotes a color video input terminal, and a luminance signal output terminal and a chroma signal output terminal of the comb filter 61 are connected in parallel to the VTR input terminals 57 and 58, respectively.

In the present embodiment, a color video signal from other than the color video camera 61 (for example, color television) is supplied to the input terminal 60, and the color video signal is completely separated into the luminance signal and the chroma signal by the comb filter 61. As a result, in the recording and reproducing operations of the color video input signal from other than the color video camera 59, a high quality of reproduced image which is free from the chroma moiré disturbance and the luminance signal dot disturbance can be obtained.

FIG. 8C shows other embodiment in which the comb filter 61 in FIG. 8B is connected in series between the color video camera 59 and the VTR.

The comb filter 61 in the present embodiment is used for the same purpose as in FIG. 8B. In this case, the output of the color video camera 59 does not include the separated luminance signal and chroma signal and it is effective when only the color video signal is included.

The chroma emphasis circuit and the chroma deemphasis circuit in FIG. 7 may be those shown in FIGS. 4A, 4B, 5A, 5B and 5C.

FIGS. 9A and 9B show other embodiments of the chroma emphasis circuit and the chroma deemphasis circuit, respectively.

In the present embodiments, side band emphasis and deemphasis circuits comprising an inverted bell filter 53 and a bell filter 62, respectively, and low amplitude signal emphasis and deemphasis circuit comprising a limiter circuit 47 and an adder circuit 48 or a subtractor circuit 51, respectively, are connected in series.

FIGS. 10A and 10B show other embodiments. In the chroma emphasis circuit of FIG. 10A, an inverted bell filter 53 and a limiter circuit 47 are connected in parallel to parallelly add the chroma signal from an input terminal 46. In the chroma deemphasis circuit of FIG. 10B, an inverted bell filter 53 and a limiter circuit 47 are connected in parallel and an output thereof is fed back.

In an embodiment of the chroma signal processor shown in FIG. 11, the comb filter 61 of FIG. 8B or 8C inserted in the proceding stage of the luminance signal input terminal 57 and the chroma signal input terminal 58 of the VTR is shared by the playback chroma comb filter 29 of FIG. 7, and the chroma emphasis circuit 38 is shared by the chroma deemphasis circuit 44.

In FIG. 11, numeral 63 denotes a color video signal input terminal, numeral 64 denotes a reproduced low-frequency converted chroma signal input terminal, numerals 65 and 68 denote switching circuits, numeral 66 denotes an ACC circuit, numeral 67 denotes a frequency converter, numeral 69 denotes a common comb filter and numeral 70 denotes a chroma emphasis/deemphasis circuit. Other portions are identical to those of FIG. 7. The operation of the embodiment of FIG. 11 is explained below.

In the recording operation, the switching circuits 65 and 66 are connected as shown. When the color video input is supplied from the color video camera as shown in FIG. 8B, the luminance signal and the chroma signal are directly supplied to the terminals 57 and 58, respectively. When the color video signal is supplied from the terminal 63, the input signal is supplied to the comb filter 69 and the brilliance signal and the chroma signal are separated to the terminals 57 and 58, respectively. The luminance signal from the terminal 57 is fed to the luminance signal processor as shown in FIG. 7, and the chroma signal from the terminal 58 is fed to the chroma emphasis/deemphasis circuit 70 where the chroma signal is emphasized. The chroma signal is then supplied to the frequency converter 67 through the switching circuit 65 and the ACC circuit 66. The chroma signal which was low-frequency converted by the frequency converter 67 is supplied to the mixer 8 through the LPF 13 and the burst emphasis circuit 14.

In the reproducing operation, the switching circuits 65 and 68 are connected oppositely to the illustrated position so that the reproduced low-frequency converted chroma signal is fed from the terminal 64 to the frequency converter 67 through the switching circuit 65 and the ACC circuit 66. The chroma signal which was frequency-converted to the original signal by the frequency converter 67 is supplied to the comb filter 69 through the switching circuit 68 so that the cross-talk component of the chroma signal from the adjacent video tracks is eliminated, and the resulting signal is fed from the terminal 58 to the chroma emphasis/deemphasis circuit 70, in which the chroma signal emphasized in the recording operation is deemphasized and the chroma signal is then supplied to the mixer 24 through the burst deemphasis circuit 30.

In accordance with the embodiment of FIG. 11, a cost can be substantially reduced by sharing the comb filter.

A third embodiment of the present invention is now explained. In the present embodiment, a side band energy of the chroma signal is dynamically emphasized, and in the reproducing operation, the side band energy of the chroma signal is dynamically deemphasized, as opposed to the recording operation at the succeeding stage of the comb filter. In accordance with the present embodiment, the disturbance due to the direct introduction of the pilot signal and the FM audio signal and the disturbance of $f_c \pm 2f_p$ due to the non-linearity of the tape and the head (which appears only in the chroma signal band and is higher in a dark color area) can be suppressed.

Figure 12:
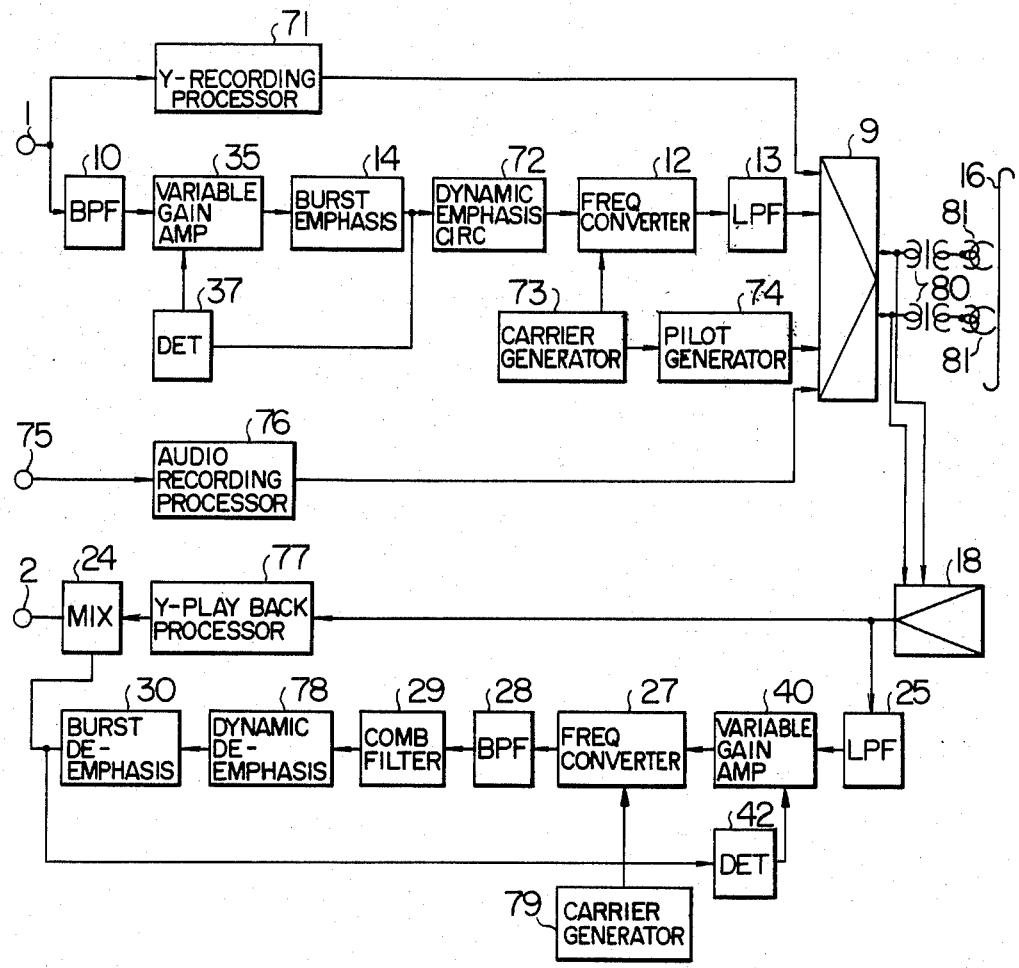
FIG. 12 shows a circuit block diagram of another embodiment of the present invention.

FIG. 12 shows an embodiment of the present invention in which the pilot signal and the FM audio signal are frequency-multiplexed to record and reproduce the color video signal in the VTR which does not adopt the H-arrangement.

Figure 13:
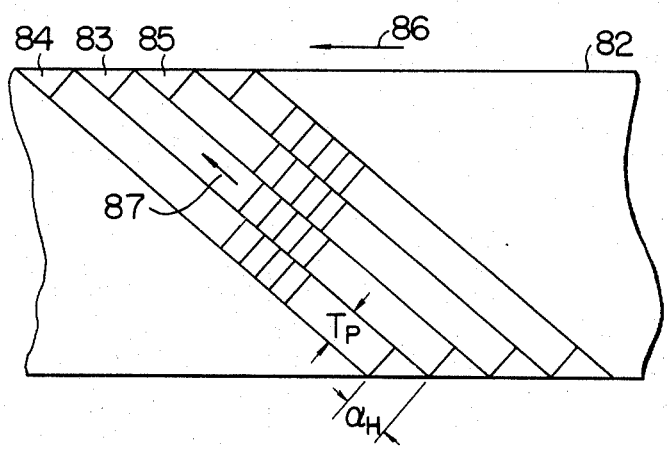
FIG. 13 shows a plan view of recording tracks on a magnetic tape.

FIG. 13 shows an example of a recorded pattern on a non-H-arrangement magnetic tape. In FIG. 13, the number of stagger $\alpha_H$ is such that a trick play is readily attained while assuring a long recording time, and the H arrangement is not included, and $\alpha_H = nH_L$ (where $n = 1, 2, 3, \ldots$).

Figure 14:
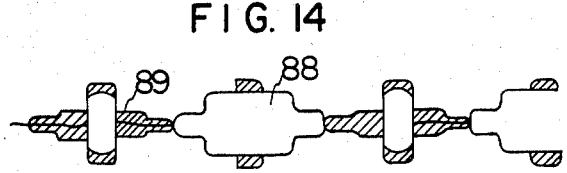
FIG. 14 shows a waveform of a reproduced chroma signal and a cross-talk signal introduced therein.

In FIG. 13, numeral 82 denotes a tape, numerals 83, 84 and 85 denote recording video tracks, numeral 86 denotes a direction of tape movement, numeral 87 denotes a scan direction of the magnetic head and $T_P$ denotes a track width. A deviation of H between adjacent tracks is equal to H/2, and the reproduced chroma signal from a main track and the cross-talk signal from the adjacent track are superimposed with a time deviation of H/2 as shown in FIG. 14, in which numeral 88 denotes the reproduced chroma signal and numeral 89 denotes the cross-talk signal. Since the burst signal is emphasized by the burst emphasis circuit, it has an amplitude substantially equal to the maximum amplitude of the chroma signal. When the maximum level of the chroma signal 88 reproduced from the main track is 0 dB, the cross-talk component amounts to approximately −6 dB. As a result, if the signal of FIG. 14 is applied directly to the dynamic deemphasis circuit 78, the cross-talk component is not substantially suppressed and the disturbance due to the pilot signal and the FM audio signal is less suppressed.

In the embodiment of FIG. 12, the reproduced signal of FIG. 14 is supplied to the converter 27, the BPF 28 and the comb filter 29 so that the cross-talk signal 89 is suppressed by approximately 26 dB, and the signal is then supplied to the dynamic deemphasis circuit 78.

In FIG. 12, numeral 71 denotes a brilliance signal recording processor, numeral 72 denotes a dynamic emphasis circuit, numeral 73 denotes a carrier signal generator, numeral 74 denotes a pilot signal generator, numeral 75 denotes an audio signal input terminal, numeral 76 denotes an audio signal recording processor, numeral 77 denotes a luminance signal playback processor, numeral 79 denotes a carrier signal generator, numeral 80 denotes a rotary transformer and numeral 81 denotes magnetic heads having different azimuth angles.

Figure 15A:
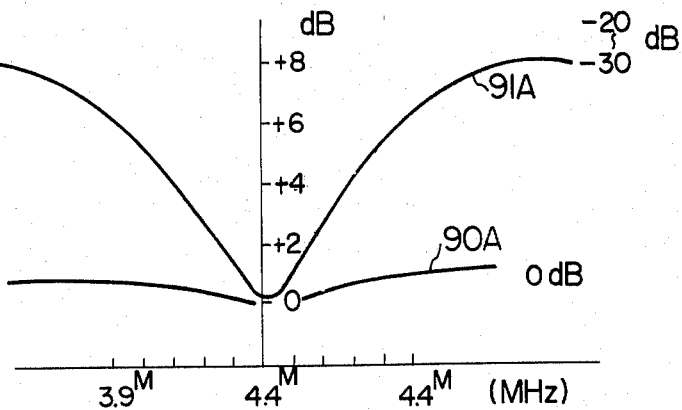
FIGS. 15A, 15B and 15C show frequency characteristic of the dynamic emphasis circuit used in the present invention.
Figure 15B:
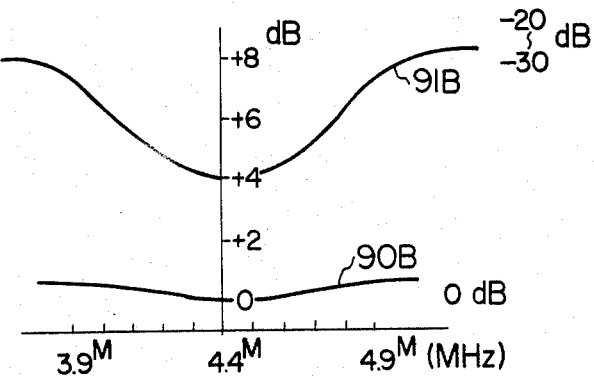
Figure 15C:
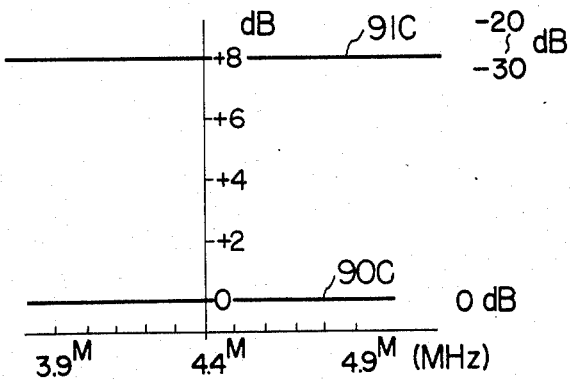
Figure 16A:
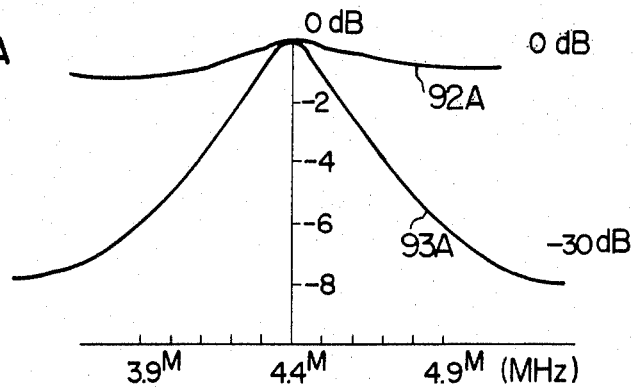
FIGS. 16A, 16B and 16C show frequency characteristic of the dynamic deemphasis circuit used in the present invention.

Referring to FIGS. 15A–15C and 16A–16C, the characteristics of the dynamic emphasis circuit and the dynamic deemphasis circuit of the present invention are explained. In FIG. 15A, a curve 90A show a frequency characteristic for a maximum amplitude signal (0 dB) of the chroma signal and a curve 91A shows a frequency characteristic for a low amplitude chroma signal (−20 dB—−30 dB). Deemphasis characteristics therefor are shown in FIG. 16A, in which a curve 92A shows a characteristic for the large amplitude chroma signal and a curve 93A shows a characteristic for the small amplitude chroma signal. Since the pilot signal and the FM audio signal are of low amplitude at the input of the dynamic deemphasis circuit and separated from $f_c$ by more than 0.5 MHz, they are suppressed by approximately 8 dB by the dynamic deemphasis circuit. For the spurious $f_c \pm 2 f_p$, if $f_p$ is 0.1 MHz, the spurious is suppressed by approximately 3 dB.

Figure 16B:
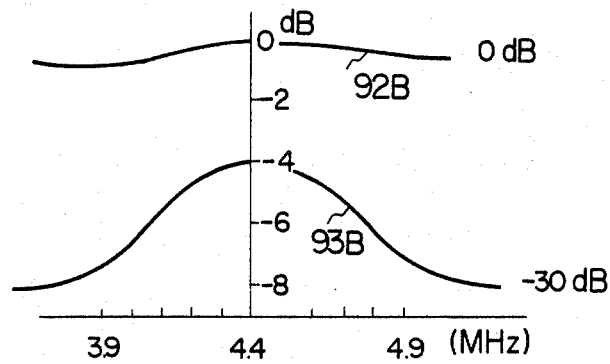
Figure 16C:
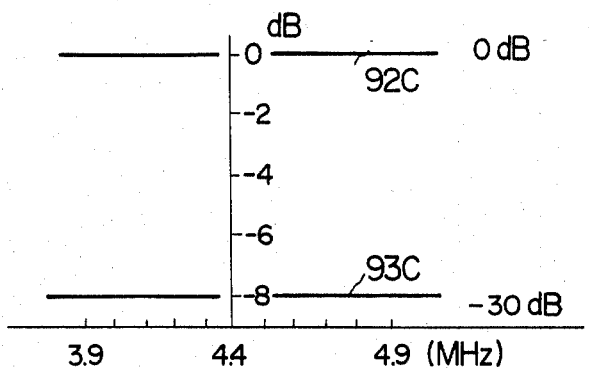

FIGS. 15B and 16B show characteristics when an instantaneous compression/expansion characteristic and a dynamic side band characteristic are used. Curves 90B and 92B show characteristics for the large amplitude signal and curves 91B and 93B show characteristics for the small amplitude signal. Similar effects to that of FIGS. 15A and 16A are attained. FIGS. 15C and 16C show emphasis characteristics for primarily suppressing the burst signal leaked from the adjacent tracks. It is characterized by a flat frequency characteristic. Curves 90C and 92C show characteristics for the large amplitude signal, and curves 91C and 93C show characteristics for the small amplitude signal.

The disturbance by the pilot signal and the FM audio signal and the disturbance by the cross-talk from the adjacent tracks are suppressed only by the dynamic deemphasis circuit and hence the dynamic emphasis circuit is not always necessary. The frequency characteristics (particularly, dependency on input level) of the dynamic emphasis circuit 72 to be considered are those three shown in FIGS. 15A–15C. In FIG. 15A, only the side band energy of the modulated chroma signal is emphasized. It is effective to suppress a beat caused by the leakage of the pilot signal 3 and the FM audio signal 4 which are frequency-multiplexed to the chroma signal 2 into the chroma signal. The emphasis characteristic of FIG. 15B is intended to suppress the burst signal which leaks from the adjacent tracks from appearing on the reproduced image and suppress the disturbance by the pilot signal. The characteristic of FIG. 15C is most effective to suppress the burst signal but not sufficient to suppress the disturbance by the pilot signal.

The cross-talk of the burst signal may amount to approximately −6 dB for the maximum level of the reproduced chroma signal. The cross-talk signal is suppressed by the comb filter 29 by 20–26 dB so that D/U at the output of the comb filter 29 is 26–32 dB.

When the input/output characteristic of the dynamic deemphasis circuit 78 is that shown in FIG. 16A, the low level signal (input level being less than −20 dB) can be suppressed by 6–8 dB. The cross-talk signal level is lowered to −26—−32 dB by the comb filter 29, and it is further suppressed by 6–8 dB by the dynamic deemphasis circuit 78. As a result, the D/U at the output of the dynamic deemphasis circuit 78 is 32–40 dB. Thus, in order to effectively suppress the crosstalk signal by the dynamic deemphasis circuit 78, it is necessary to previously suppress the cross-talk by the comb filter 29 by a sufficient amount. Accordingly, it is desirable that the dynamic deemphasis is effected not in the low frequency converted band but in 4.4 MHz band for the CCIR and 3.6 MHz band for the NTSC. Accordingly, it is also desirable that the dynamic emphasis circuit 23 which is the inverse circuit of the dynamic deemphasis circuit 35 is arranged in the 4.4 MHz or 3.6 MHz band.

By the arrangement of FIG. 12, not only the disturbance by the pilot signal and the FM audio signal can be suppressed as intended but also the cross-talk component can be suppressed so that the chroma image quality is improved. Thus, when the H-arrangement is not adopted and the burst emphasis is effected, the burst disturbance problem does not arise and hence both the optimization of the recording time and the improvement of the chroma image quality can be attained.

Figure 17:
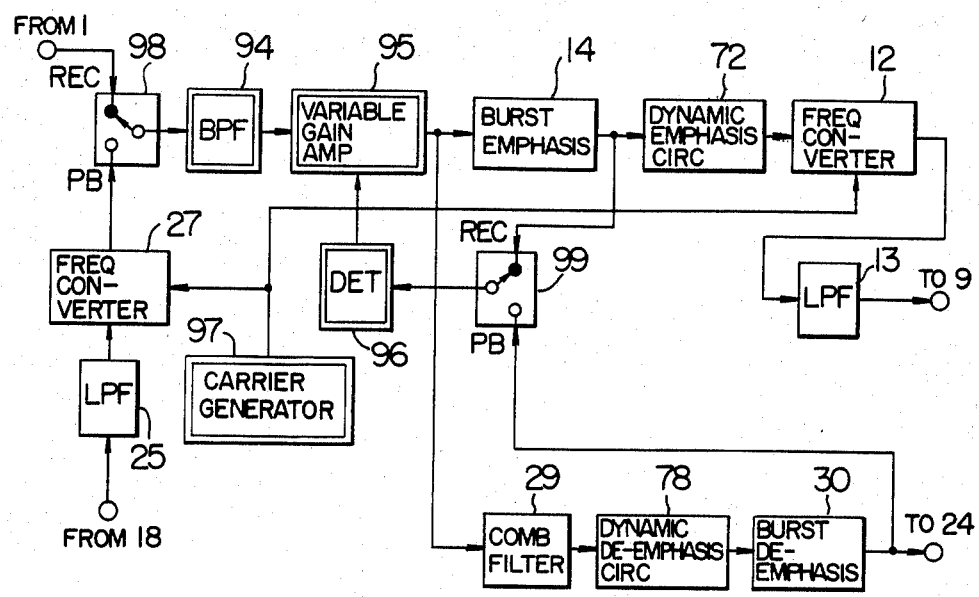
FIG. 17 shows a circuit block diagram of a modification of the embodiment shown in FIG. 12.

FIG. 17 shows an embodiment which attains the same performance as the embodiment of FIG. 12 and in which a BPF 94, a variable gain amplifier 95, a detection circuit 96 and a carrier generator 97 are shared by the recording circuit and the playback circuit. In order to minimize the number of switches 98 and 99 switched between the recording operation and the playback operation, it is necessary that the output of the BPF 94 is directly connected to the input of the variable gain amplifier 95. On the other hand, the dynamic deemphasis circuit 78 should be inserted at the output of the variable gain amplifier 95.

Figure 18:
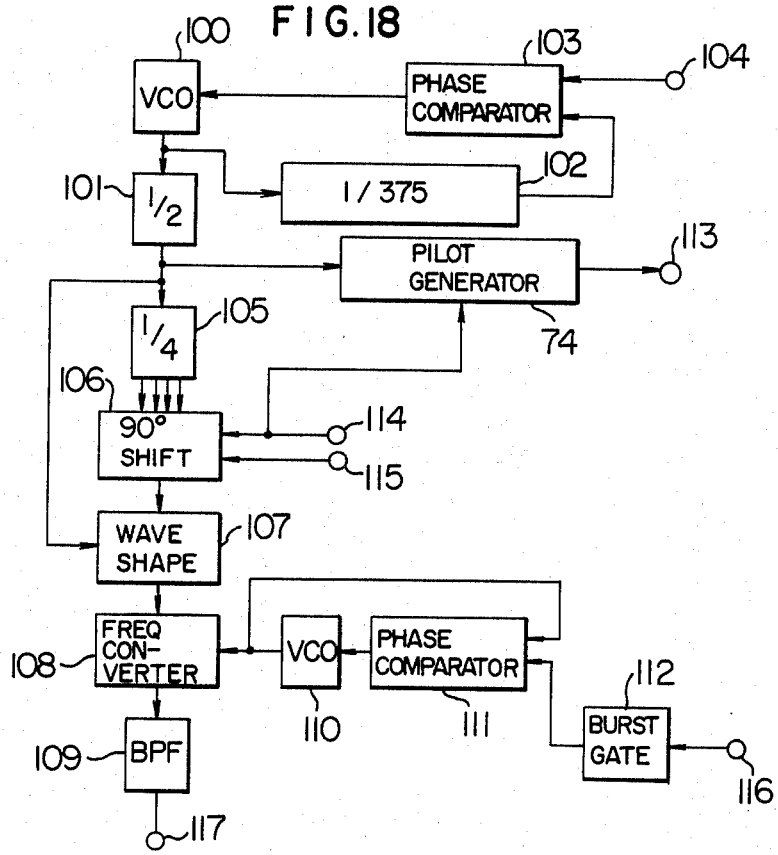
FIG. 18 shows a block diagram of an embodiment of a carrier generator 97 shown in FIG. 17.

FIG. 18 shows a block diagram of an embodiment of the CCIR conversion carrier generator 97 which converts the chroma signal frequency to be recorded on the tape to $(47-\frac{1}{8})f_H$, where $f_H$ is a horizontal sync. frequency.

In FIG. 18, numeral 100 denotes a VCO having an oscillation frequency of $375f_H$, numeral 102 denotes a 1/375 frequency divider, numeral 103 denotes a phase comparator for detecting a phase difference between the output signal of the frequency divider 102 and a horizontal sync. signal applied to a terminal 104, numeral 101 denotes a $\frac{1}{2}$ frequency divider, and numeral 74 denotes a pilot signal generator having four frequency dividers of 1/29, 1/25, 1/20 and 1/18. Pilot signals of $(375/58)f_H=6.466f_H=101.0$ KHz, $(375/50)f_H=7.50f_H=117.2$ KHz, $(375/40)f_H=9.375f_H=146.5$ KHz and $(375/36)f_H=10.417f_H=162.8$ KHz are produced at a pilot signal output terminal 113.

Numeral 105 denotes a $\frac{1}{4}$ frequency divider which produces four signals having a frequency of $(375/8)f_H$ and phases of 0°, 90°, 180° and 270°. Numeral 106 denotes a 90° phase shift circuit which does not shift a phase in a first field and advances or retards the phase by 90° for each horizontal scan in a second field. Numeral 114 denotes a field frequency pulse terminal (25 Hz for both PAL and SECAM). Numeral 115 denotes a horizontal pulse terminal (15.625 KHz for both PAL and SECAM). Numeral 107 denotes a wave shaper which shapes a rising timing of the output signal of the phase shift circuit 106 and provides an exact 90° phase difference for each horizontal scan. The wave shaper 107 produces a carrier of a continuous phase of $(375/8)f_H=(47-\frac{1}{8})f_H$ in the first field and a carrier of $(47-\frac{1}{8})f_H$ and having a phase which shifts by 90° for each horizontal scan. The 4.43 MHz VCO 100, a phase comparator 111, a burst gate circuit 112 and a burst signal terminal 116 form a phase locked loop which generates a continuous carrier of 4.43 MHz. Numeral 108 denotes a frequency converter and numeral 109 denotes a BPF which produces a signal of $4.43+(47-\frac{1}{8})f_H$.

Specific embodiments of the dynamic emphasis circuit 72 and the dynamic deemphasis circuit 78 are shown in FIGS. 19-21. FIG. 14 shows the embodiment of the dynamic emphasis circuit and FIGS. 15 and 16 show the embodiments of the dynamic deemphasis circuit. As seen from those figures, the dynamic emphasis circuit and the dynamic deemphasis circuit are non-linear circuits. In order for the emphasis characteristic and the deemphasis characteristic to be inverse, a signal level applied to the non-linear circuit (diode) of the emphasis circuit 72 must be approximately equal to that of the deemphasis circuit 78. In FIG. 21, numeral 118 denotes a high gain differential amplifier. In FIGS. 19-21, in order to attain the characteristics shown in FIGS. 15A, 15B, 16A and 16B, it is necessary that $$L_1 \cdot C_1 \approx L_2 \cdot C_2$$

$$C_1 \cdot R_1 \approx C_2 \cdot R_2$$

are met. $C_3$ denotes a D.C. blocking capacitor which has a sufficiently large capacitance.

In the circuit of FIG. 12, if the gain of the comb filter 29 varies, the input/output level of the dynamic deemphasis circuit 78 varies in accordance with the gain variance. To resolve the above problem, the comb filter shown in FIG. 22 may be used. In FIG. 22, numeral 119 denotes a 1H delay line ($\tau \approx 63.5$ μs) for the NTSC or a 2H delay line ($\tau \approx 128$ μs) for the CCIR, which is usually a supersonic glass delay line. Since a variance of an insertion loss of the delay line 119 is approximately ±2 dB, a level adjuster 120 is provided. Numeral 121 denotes an amplifier and numeral 122 denotes a subtractor. In this circuit, a gain (or insertion loss) from the input terminal to the output terminal of the comb filter 29 is constant but an additional amplifier 69 is required.

Figure 23:
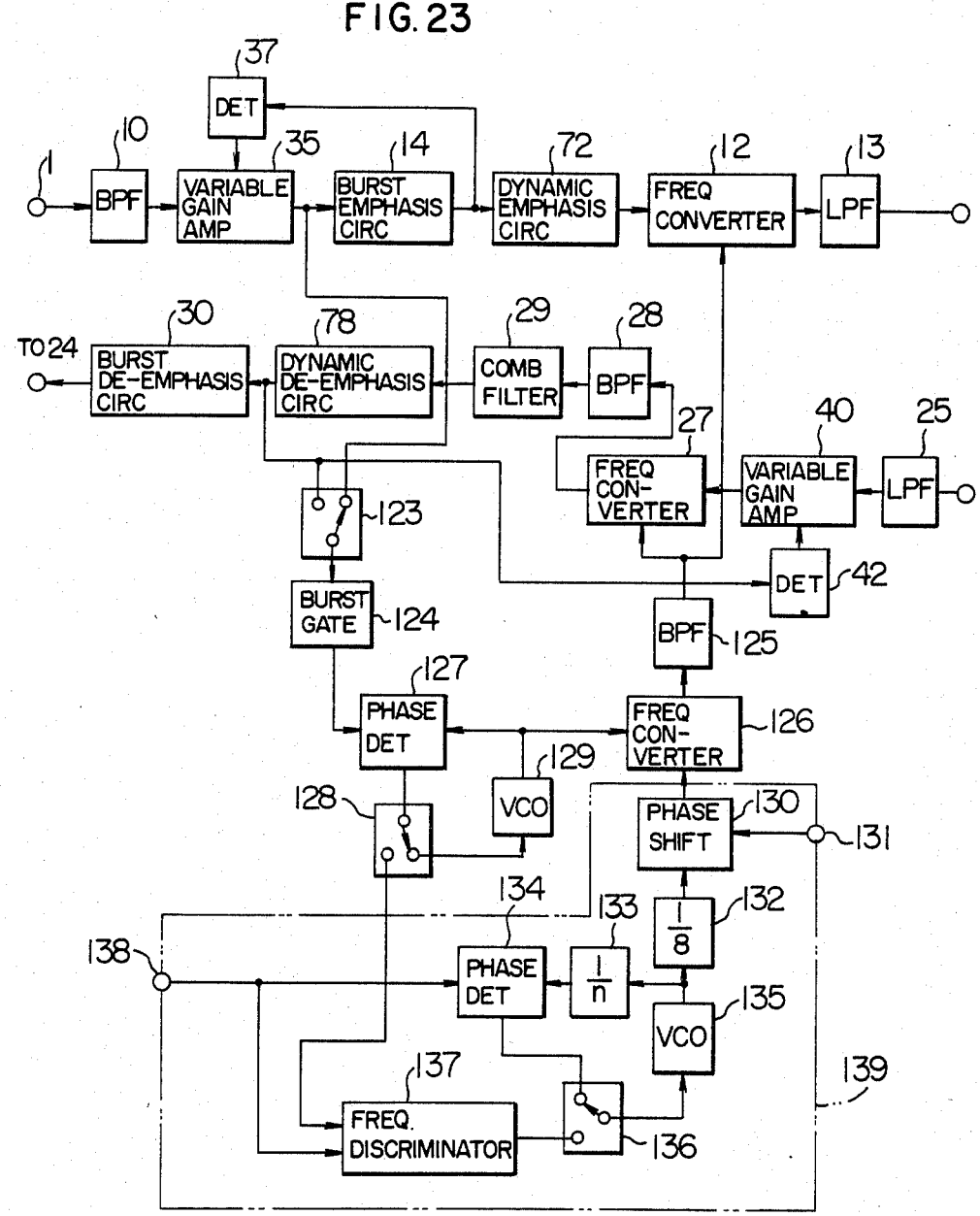
FIG. 23 shows a circuit block diagram of another embodiment of the present invention.

FIG. 23 shows a fourth embodiment of the present invention. In the present embodiment, the burst signal at the output of the dynamic deemphasis circuit is used as a reference signal to the carrier signal to frequency-convert the reproduced chroma signal.

In FIG. 23, the like blocks to those shown in FIG. 12 are designated by the like numerals. In the recording circuit, the output of the dynamic emphasis circuit 72 is converted to a low frequency chroma signal by the frequency converter 12 and the chroma signal is supplied to the LPF 13, an output of which is mixed with the frequency modulated luminance signal, the FM audio signal and the tracking control pilot signal, and the mixed signals are recorded on the record tape by the record head. The signal reproduced by the playback head is supplied to the LPF 25, the variable gain amplifier 40 and the detector 42 to selectively amplify the low frequency chroma signal. The chroma signal is then converted to a chroma signal of a normal frequency band by a carrier signal generated by the frequency converter 126 and the BPF 125, and a spurious component is eliminated by the BPF 28. The level of the burst signal emphasized in the recording operation is deemphasized by the burst demphasis circuit 30 through the dynamic deemphasis cirucit 78 having the inverse characteristic to the dynamic emphasis circuit 72, and the chroma signal is then mixed with the reproduced brilliance signal to reproduce the video signal.

In the recording operation, the switches 123, 128 and 136 are in the positions shown, and they are switched to the opposite positions in the playback operation. The recording operation is explained below. Numeral 124 denotes a burst gate circuit which extracts only the burst signal. In the recording operation, the output signal of the ACC amplifier 35 is supplied to the phase detector 127 through the switch 123. The phase detector 127 controls the oscillation frequency of the VCO 129 such that it coincides with a carrier chroma signal frequency $f_{sc}$ and produces a first carrier. Numeral 138 denotes an input terminal for the horizontal sync. signal or equivalent signal. The phase detector 134 and the 1/n frequency divider 133 control the oscillation frequency of the VCO 135 such that it coincides with $nf_H$, where $f_H$ is the horizontal scan frequency. Numeral 132 denotes a ⅛ frequency divider for the output signal of the VCO 135 and it produces a second carrier such that the recording chroma signal frequency has a predetermined frequency offset at the phase shift circuit 130.

The playback operation is now explained. The differences from the recording operation reside in that the switch 123 is switched so that the output signal of the dynamic deemphasis circuit 78 is supplied to the phase detector 127 through the burst gate circuit 124, the switches 128 and 136 are switched so that the output signal of the phase detector 127 produces the second carrier, and the VCO 135 is controlled through a frequency discriminator 137 and the VCO 129 free-oscillates at a frequency $f_{sc}'$ substantially equal to the carrier chroma signal frequency to produce the first carrier signal. The frequency converter 126 extracts the sum signal of the first carrier and the second carrier by the BPF 125 both in the recording operation and in the playback operation, and the frequency converter 12 produces the recording chroma signal frequency which is equal to the second carrier in the recording operation. In the playback operation, the frequency converter 27 restores the chroma signal of the carrier chroma signal frequency equal to the first carrier.

The low-frequency converted chroma signal frequency should have an offset between fields which is an odd multiple of $(\frac{1}{2})f_H$ and an offset equal to $(\frac{1}{4})f_H$ for the NTSC. For example, when the frequency of the low frequency chroma signal, that is, the second carrier is $(47+\frac{1}{4})f_H$, the oscillation frequency of the VCO 135 is $(47+\frac{1}{4})f_H \times 8 = 378f_H$ and the frequency division ratio n of the 1/n frequency divider 133 is selected to 378. The phase shift circuit 130 inverts the phase of the second carrier signal in one of the fields by 180 degrees for each horizontal scan period in order to produce the frequency offset between fields.

In the PAL system, it is necessary that the offset between fields is an odd multiple of $(\frac{1}{4})f_H$ and the offset is equal to $(\frac{1}{8})f_H$. For example, when the frequency of the low frequency chroma signal, that is, the second carrier signal is $(47-\frac{1}{8})f_H$, the oscillation frequency of the VCO 135 is $(47-\frac{1}{8})f_H \times 8 = 375 f_H$ and the ratio n is selected to 375. The phase shift circuit 130 retards or advances the phase of the second carrier signal in one of the fields by 90 degrees for each horizontal scan period. Accordingly, by the frequency offset of the second carrier, the low frequency chroma signal is recorded or reproduced at the frequency which satisfies the above conditions for the NTSC and the PAL.

In the present embodiment, the ACC circuit may be shared by the recording circuit and the playback circuit like in FIG. 17 for the embodiment of FIG. 12.

Figure 24:
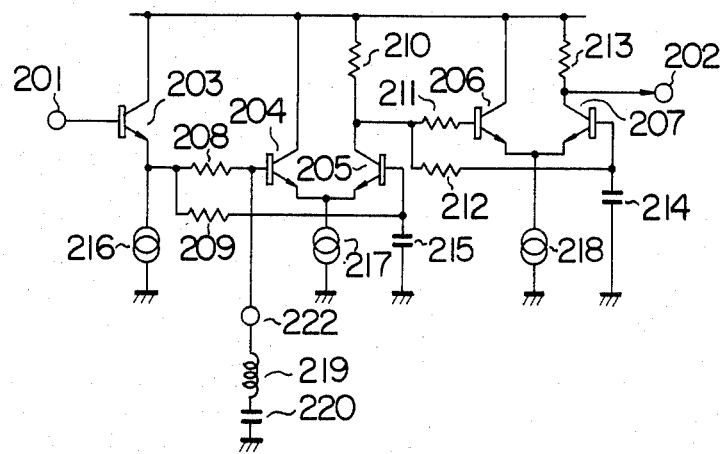
FIGS. 24 and 25 show embodiments of the dynamic emphasis circuit having an emphasis characteristic shown in FIG. 15A.
Figure 25:
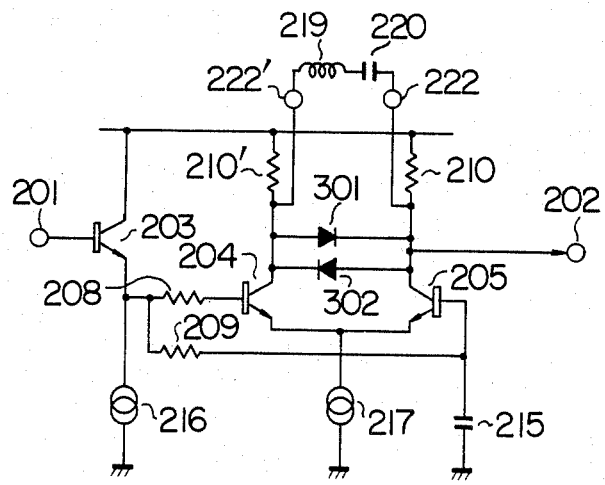

FIGS. 24 and 25 show embodiments of the dynamic emphasis circuit of the present invention which are ready to implement in IC devices. Both FIGS. 24 and 25 attain the emphasis characteristic shown in FIG. 15A.

In FIG. 24, the chroma signal is applied to an input terminal 201. Differential amplifiers 204 and 205 are driven by an emitter follower transistor 203. Numeral 209 denotes a biasing resistor and numeral 215 denotes a biasing capacitor. A resistor 208, a capacitor 220 and an inductor 219 provide a trap characteristic, and a chroma signal which is suppressed near a chroma sub-carrier frequency is produced across a load resistor 210. Transistors 206 and 207 form a limiter circuit. A resistor 212 and a capacitor 214 are biasing resistor and capacitor, resistors 211 and 212 are of the same resistance to balance the voltage drops by the base currents of the transistors 206 and 207 and attain a better limiter characteristic. A signal to an adder is produced at an output terminal 202 through a load resistor 213. In implementing the circuit by an IC device, the necessary pin is only the terminal 222. The capacitors 215 and 214 may be of several tens pF when the resistors 209 and 212 are properly selected. Thus, they can be integrated in the IC.

The circuit of FIG. 25 differs from FIG. 24 in that the series resonance circuit of the trap circuit is connected to the collector of the differential amplifier 204, 205 and a limiter circuit comprising diodes 301 and 302 is replaced by the transistors 206 and 207. In FIG. 25, the signal level of the output terminal 202 is constant whether the input signal to the terminal 201 is large or small, and the trap circuit 219, 220 acts on the limited signal. Accordingly, an effective Q of the emphasis characteristic does not change.

In the present embodiment, in order to change the emphasis characteristic, an amplifier may be inserted in the preceding stage of the terminal 201 or an limiter circuit may be added to the succeeding stage of the terminal 202.

What is claimed is:

1. A chroma signal recording and reproducing circuit in a magnetic recording and reproducing apparatus for frequency-modulating a luminance signal of a color video signal, low-frequency converting a chroma signal of said video signal, frequency-multiplexing at least the frequency-modulated luminance signal and the low-frequency converted chroma signal, recording the frequency-multiplexed luminance and chroma signals by a recording magnetic head on a magnetic recording medium and reproducing the frequency-multiplexed luminance and chroma signals by a reproducing magnetic head from said magnetic recording medium, said chroma signal recording and reproducing circuit comprising:

chroma signal recording means coupled for connection to said recording magnetic head including at least a first ACC circuit and a first frequency converter connected in series with said first ACC circuit for low-frequency converting the chroma signal; and chroma signal reproducing means coupled for connection to said reproducing magnetic head including a second ACC circuit, and a second frequency converter connected in series with said second ACC circuit for frequency-converting the low-frequency converted chroma signal, a first comb filter connected to an output of the series connection of said second ACC circuit and second frequency converter, and a dynamic deemphasis circuit connected to an output of said first comb filter for dynamically deemphasizing an output signal of said first comb filter in response to the level of said output signal.

2. A chroma signal recording and reproducing circuit according to claim 1 wherein said chroma signal recording means further includes a dynamic emphasis circuit connected to an output of said first ACC circuit for dynamically emphasizing an output signal of said first ACC circuit in response to said output signal of said first ACC circuit, and wherein said first frequency converter is connected to an output of said dynamic emphasis circuit.

3. A chroma signal recording and reproducing circuit according to claim 2 wherein said first ACC circuit includes a first variable gain amplifier and a first detector for supplying a control signal to said first variable gain amplifier, an input signal to said dynamic emphasis circuit being supplied to said first detector as an input signal thereto.

4. A chroma signal recording and reproducing circuit according to claim 1, 2 or 3 wherein said second ACC circuit includes a second variable gain amplifier and a second detector for supplying a control signal to said second variable gain amplifier, an output signal of said dynamic deemphasis circuit being supplied to said second detector as an input signal thereto.

5. A chroma signal recording and reproducing circuit according to claim 2 wherein said first ACC circuit includes a first variable gain amplifier and a first detector for supplying a control signal to said first variable gain amplifier, an output signal of said dynamic emphasis circuit being supplied to said first detector as an input signal thereto, and said second ACC circuit includes a second variable gain amplifier and a second detector for supplying a control signal to said second variable gain amplifier, an input signal to said dynamic deemphasis circuit being supplied to said second detector as an input signal thereto.

6. A chroma signal recording and reproducing circuit according to claim 1, 2 or 3 wherein a chroma signal output terminal of a color camera having a luminance signal output terminal and the chroma signal output terminal, or a chroma signal output terminal of a second comb filter connected to a video signal terminal is connected to an input terminal of said first ACC circuit of said chroma signal recording means.

7. A chroma signal recording and reproducing circuit according to claim 1, 2 or 3 wherein said dynamic deemphasis circuit has a characteristic that a deemphasis amount thereof is inversely proportional to said level of said output signal of said first comb filter.

8. A chroma signal recording and reproducing circuit according to claim 7 wherein a third signal having a frequency close to a carrier frequency of the low-frequency converted chroma signal is frequency-multiplexed to the frequency-modulated luminance signal and the low-frequency converted chroma signal.

9. A chroma signal recording and reproducing circuit according to claim 8 wherein said third signal is a pilot signal containing frequencies of $(375/58)f_H$, $(375/50)f_H$, $(375/40)f_H$ and $(375/36)f_H$, and the carrier frequency of the low-frequency converted chroma signal is $(375/8)f_H$, $f_H$ being a horizontal sync-frequency.

10. A chroma signal recording and reproducing circuit according to claim 9 wherein a frequency-modulated audio signal having a carrier frequency interposed between a frequency band of the low-frequency converted chroma signal and a frequency band of the frequency-modulated luminance signal is frequency-multiplexed.

11. A chroma signal recording and reproducing circuit according to claim 2 or 3 wherein said dynamic emphasis circuit has a characteristic that an emphasis amount thereof is inversely proportional to said level of said output signal of said first ACC circuit.

12. A chroma signal recording and reproducing circuit according to claim 1 or 2 wherein a burst signal is extracted from an output of said dynamic deemphasis circuit for use as a reference signal to generate a carrier signal for said second frequency converter.

13. A chroma signal recording and reproducing circuit according to claim 1 or 2 wherein said dynamic deemphasis circuit is constructed by a limiter and a subtracter, an input signal of said dynamic deemphasis circuit and an output signal of said limiter being input signals of said subtracter, and an output signal of said subtracter being an input signal of said limiter and an output signal of said dynamic deemphasis circuit.

14. A chroma signal recording and reproducing circuit according to claim 1 or 2 wherein said dynamic deemphasis circuit is constructed by a limiter, a subtracter and a reverse bell filter, an input signal of said dynamic deemphasis circuit and an output signal of said limiter being input signals of said subtracter, an output signal of said subtracter being an input signal of said reverse bell filter and an output signal of said dynamic deemphasis circuit, and an output signal of said reverse bell filter being an input signal of said limiter.

15. A chroma signal recording and reproducing circuit according to claim 2 wherein said dynamic emphasis circuit is constructed by a limiter and an adder, an input signal of said dynamic emphasis circuit and an output signal of said limiter being input signals of said adder, an output signal of said adder being an output signal of said dynamic emphasis circuit, and the input signal of said dynamic emphasis circuit being an input signal of said limiter.

16. A chroma signal recording and reproducing circuit according to claim 2 wherein said dynamic emphasis circuit is constructed by a limiter, an adder and a reverse bell filter, an input signal of said dynamic emphasis circuit and an output signal of said limiter being input signals of said adder, an output signal of said adder being an output signal of said dynamic emphasis circuit, the input signal of said dynamic emphasis circuit being an input signal of said reverse bell filter, and an output signal of said reverse bell filter being an input signal of said limiter.

17. A chroma signal recording and reproducing circuit according to claim 1, wherein said recording magnetic head and said reproducing magnetic head are formed as a common magnetic head for both recording and reproducing.

18. A chroma signal recording and reproducing circuit of a magnetic recording and reproducing apparatus having a recording circuit for frequency-modulating a luminance signal of a color video signal, low-frequency converting a chroma signal and frequency-multiplexing said luminance and chroma signals for recording and a reproducing circuit for frequency-converting a low frequency converted chroma signal to a reproduced chroma signal and frequency-demodulating a FM luminance signal to a reproduced luminance signal, comprising:

chroma signal recording means including at least a first ACC circuit and a first frequency converter connected to an output of said first ACC circuit; and chroma signal reproducing means inlcuing at least a second ACC circuit, a second frequency converter connected to an output of said second ACC circuit, a comb filter connected to said second frequency converter and a dynamic deemphasis circt connected to an output of said comb filter for dynamically deemphasizing the reproduced chroma signal.

19. A chroma signal recording and reproducing circuit according to claim 18 wherein said chroma signal recording means further includes a dynamic emphasis circuit for dynamically emphasizing the chroma signal connected between said first ACC circuit and said first frequency converter.

20. A chroma signal recording and reproducing circuit according to claim 19 wherein said dynamic emphasis circuit dynamically emphasizes a side band of the chroma signal and said dynamic deemphasis circuit dynamically deemphasizes a side band of the chroma signal.

21. A chroma signal recording and reproducing circuit according to claim 18, 19 or 20 wherein said chroma signal recording means further includes a burst emphasis circut connected between said first ACC circuit and said dynamic emphasis circuit, and said chroma signal reproducing means further includes a burst deemphasis circuit connected to an output of said dynamic deemphasis circuit.

22. A chroma signal recording and reproducing circuit according to claim 19 wherein said dynamic emphasis circuit has a characteristic that an emphasis amount thereof is inversely proportional to said level of said ouput signal of said first ACC circuit.

23. A chroma signal recording and reproducing circuit according to claim 18 wherein said dynamic deemphasis circuit has a characteristic that a deemphasis amount thereof is inversely proportional to said level of said output signal of said comb filter.

24. A chroma signal reproducing circuit of a magnetic recording and reproducing apparatus for frequency-multiplexing at least a frequency-modulated luminance signal of a color video signal and a low-frequency converted chroma signal for recording on a magnetic recording medium and reproducing a color video signal therefrom, comprising:
an ACC circuit;
a frequency converter connected in series with said ACC circuit for frequency-converting the low-frequency converted chroma signal to a chroma signal;
a comb filter connected to the series connection of said ACC circuit and said frequency converter for filtering the chroma signal; and
a dynamic deemphasis circuit connected to an output of said comb filter for dynamically deemphasizing an output of said comb filter.

25. A chroma signal reproducing circuit according to claim 24 wherein said frequency converter includes a variable gain amplifier and a detector for supplying a control signal to said amplifier, an output signal of said dynamic deemphasis circuit being supplied to said detector as an input signal thereto.

26. A chroma signal recording and reproducing circuit according to claim 24 wherein said dynamic deemphasis circuit has a characteristic that a deemphasis amount thereof is inversely proportional to said level of said output signal of said comb filter.

27. A chroma signal recording and reproducing circuit in a magnetic recording and reproducing apparatus for frequency-modulating a luminance signal of a color video signal, low-frequency converting a chroma signal of said color video signal, frequency-multiplexing at least the frequency-modulated luminance signal and the low-frequency converted chroma signal, recording the frequency-multiplexed luminance and chroma signals by a recording magnetic head on a magnetic recording medium and reproducing the frequency-multiplexed luminance and chroma signals by a reproducing magnetic head from said magnetic recording medium, said chroma signal recording and reproducing circuit comprising:
chroma signal recording means coupled for connection to said recording magnetic head including at least a first ACC circuit and a first frequency converter connected in series with said first ACC circuit for low-frequency converting the chroma signal; and
chroma signal reproducing means coupled for connection to said reproducing magnetic head including said first ACC circuit and a second frequency converter connected in series wih said first ACC circuit for frequency-converting the low-frequency converted chroma signal, a first comb filter connected to an output of the series connection of said first ACC circuit and second frequency converter, and a dynamic deemphasis circuit connected to an output of said first comb filter, wherein said chroma signal recording means further includes a dynamic emphasis circuit connected to an output of said first ACC circuit for dynamically emphasizing an output signal of said first ACC circuit in response to said output signal of said first ACC circuit, wherein said first frequency converter is connected to an output of said dynamic emphasis circuit, wherein said first ACC circuit includes a variable gain amplifier and a detector for producing a control signal to said amplifier, and wherein said recording and reproducing circuit further comprises a first switch for selectively connecting an input terminal of said detector to an input stage of said emphasis circuit or an output stage of said deemphasis circuit.

28. A chroma signal recording and reproducing circuit according to claim 27 including a second switch for selectively connecting an input terminal of said first ACC circuit to an output stage of said second frequency converter or an input terminal to which at least the chroma signal is applied, and wherein said first comb filter is connected to an output of said first ACC circuit.

29. A chroma signal recording and reproducing circuit according to claim 28 wherein a band-pass filter is inserted between said first ACC circuit and said second switch.

30. A chroma signal recording and reproducing circuit according to claim 27, wherein said recording magnetic head and said reproducing magnetic head are formed as a common magnetic head for both recording and reproducing.

31. A chroma signal recording and reproducing circuit according to claim 27 wherein a burst signal is extracted from an output of said dynamic deemphasis circuit for use as a reference signal to generate a carrier signal for said second frequency converter.

* * * * *